US010178226B2

(12) United States Patent
Stroppa et al.

(10) Patent No.: US 10,178,226 B2
(45) Date of Patent: Jan. 8, 2019

(54) SYSTEM AND A METHOD FOR SELECTING A RING BACK TONE TO BE PROVIDED TO A CALLER

(71) Applicant: OnMobile Global Limited, Bangalore (IN)

(72) Inventors: Florent Stroppa, Bangalore (IN); Henri Bravard, Bangalore (IN); Ratikanta Roy, Bangalore (IN); Christelle Chauveau, Bangalore (IN)

(73) Assignee: OnMobile Global Limited, Bangalore Karnataka (IN)

( * ) Notice: Subject to any disclaimer, the term of this patent is extended or adjusted under 35 U.S.C. 154(b) by 0 days.

(21) Appl. No.: 15/701,028

(22) Filed: Sep. 11, 2017

(65) Prior Publication Data

US 2018/0077279 A1    Mar. 15, 2018

(30) Foreign Application Priority Data

Sep. 12, 2016   (IN) .............................. 201641031100

(51) Int. Cl.
*H04M 3/42*      (2006.01)
*G06F 21/60*     (2013.01)
(Continued)

(52) U.S. Cl.
CPC ...... *H04M 3/42017* (2013.01); *G06F 21/602* (2013.01); *G06F 21/606* (2013.01); *G10L 19/173* (2013.01); *G11B 27/031* (2013.01); *H04L 67/02* (2013.01); *H04M 3/02* (2013.01); *H04M 3/42161* (2013.01); *H04M 1/72519* (2013.01)

(58) Field of Classification Search
CPC ......... H04M 3/42017; H04M 2207/18; H04M 3/4211; H04M 3/02; H04M 3/42068; H04M 3/4878; H04M 7/129; H04M 3/42102; H04M 7/0072; H04M 2203/306; H04M 3/42161; H04M 3/487; H04M 19/041; H04M 2203/2072; H04M 3/42059; H04M 3/42153
USPC ........... 379/207.16, 257, 87, 373.02, 374.01, 379/201.01, 201.12, 207.02, 373.01, 379/373.03, 69, 142.01, 210.01, 215.01, 379/219, 221.04, 221.09, 252, 375.01, 379/380, 418, 88.13, 114.05, 114.13
See application file for complete search history.

(56) References Cited

U.S. PATENT DOCUMENTS 5,490,054 A *  2/1996  Hanebrink, Jr. ...... H04M 19/02
                                                363/21.09
7,995,728 B1 *  8/2011  Martin .............. H04M 3/42017
                                                379/201.02

(Continued)

*Primary Examiner* — Akelaw Teshale
(74) *Attorney, Agent, or Firm* — Knobbe Martens Olson & Bear LLP

(57) ABSTRACT

The present subject matter relates to a method and a system for selecting a ring back tone to be provided to a caller. The method comprising selecting, by a subscriber, an editable audio file with a predetermined duration; encrypting the selected editable audio file on a storage device; communicating, by a communication interface, a start time of the selected editable audio file to the server, the server transcodes and smoothens the selected portion of the editable audio file; transferring, by the server, the transcoded audio file to the mobile operator network as a ring back tone.

6 Claims, 3 Drawing Sheets

(51) Int. Cl.
  *G10L 19/16*   (2013.01)
  *G11B 27/031*  (2006.01)
  *H04L 29/08*   (2006.01)
  *H04M 3/02*    (2006.01)
  *H04M 1/725*   (2006.01)

(56) References Cited

U.S. PATENT DOCUMENTS

| | | | | |
|---|---|---|---|---|
| 8,059,800 B1* | 11/2011 | Martin | H04M 15/68 | 379/114.01 |
| 8,150,024 B1* | 4/2012 | Martin | H04M 3/42017 | 379/22.08 |
| 2004/0114732 A1* | 6/2004 | Choe | H04M 3/02 | 379/88.17 |
| 2005/0207555 A1* | 9/2005 | Lee | H04M 3/42017 | 379/207.16 |
| 2005/0243989 A1* | 11/2005 | Lee | H04M 3/42017 | 379/207.16 |
| 2007/0189488 A1* | 8/2007 | Stoops | H04M 3/42017 | 379/207.16 |
| 2007/0218877 A1* | 9/2007 | Mills | H04M 3/42017 | 455/414.1 |
| 2007/0291931 A1* | 12/2007 | DeMent | H04M 3/42017 | 379/418 |
| 2008/0214206 A1* | 9/2008 | Shimanuki | H04M 3/42017 | 455/456.1 |
| 2009/0285379 A1* | 11/2009 | Jeon | H04M 3/42017 | 379/207.16 |
| 2010/0014647 A1* | 1/2010 | Subramaniam | H04M 3/42017 | 379/87 |
| 2010/0020945 A1* | 1/2010 | Li | H04M 3/42017 | 379/87 |
| 2013/0034222 A1* | 2/2013 | Li | H04M 3/42017 | 379/207.16 |
| 2017/0331948 A1* | 11/2017 | Ahn | H04M 3/42017 | |

* cited by examiner

SYSTEM AND A METHOD FOR SELECTING A RING BACK TONE TO BE PROVIDED TO A CALLER

CROSS REFERENCES TO RELATED APPLICATION

This application claims the benefit of priority to Indian Patent Application No. 201641031100, filed on Sep. 12, 2016, the disclosure of which is hereby expressly incorporated by reference in its entirety.

FIELD OF THE INVENTION

The invention relates to a system and a method for enhancing user experience with the Ringback tones (RBTs) and more specifically to assigning sampled audio stream as a RBT.

BACKGROUND

A Ring back tone (RBT) is an audible indication that is heard by the caller in a telephonic communication while the caller's phone is still ringing. It is normally a repeated tone, designed to assure the caller that the called party's line is ringing.

The RBT may be generated in the distant switch and transmitted in-band. In analog networks the caller could therefore monitor the quality of the complete voice path of the connection before the call was established. The distant switch also sends a message out-of-band indicating to the rest of the following network that the phone is ringing. Under strict implementation of certain protocols and signaling systems, the closest switch to the caller generates the RBT. In most public phone networks the RBT is not generated in the handset or by the local switch, as customized tones or voice announcements may be generated by the distant switch in place of a ringing signal. Conventionally, the operator generated RBTs plays on for nearly 8 s-10 s and the convention 'tring-tring' or other caller tones leaves little room for customization and user enhancement.

In RBT application in its current form, there is a fixed catalogue of short RBT clips (30 s duration), provided by music labels that the end-user chooses to play as RBT. However, this approach restricts user choices of music because the most meaningful part of the song can be anywhere in the song.

SUMMARY

The present invention allows a subscriber to entertain his/her caller by playing a more interesting sound (e.g. a short piece of music) instead of the conventional "tring tring" sound. Hence, the present invention redefines the user experience by giving the user the freedom to select a specific portion of a full song, of his/her choice and set it as an RBT.

This service is specifically offered for the applications which can be mobile based or desktop based. The user can listen to the full song inside the application, select a particular sample and assign the sample as a RBT for the caller.

The present subject matter relates to a system and a method for selecting a ring back tone to be provided to a caller by using a mobile application or a desktop based application.

The present subject matter relates to a method for selecting a ring back tone to be provided to a caller. The method comprising selecting, by a subscriber, an editable audio file with a predetermined duration; encrypting the selected editable audio file on a storage device; communicating, by a communication interface, a start time of the selected editable audio file to the server, the server transcodes and smoothens the selected portion of the editable audio file; transferring, by the server, the transcoded audio file to the mobile operator network as a ring back tone.

In an embodiment of the present subject matter, the subscriber may identify the editable audio file by a unique scissors icon.

In another embodiment of the present subject matter, the server may support download feature of the selected editable audio file over HTTP at different bitrates.

In another embodiment of the present subject matter, the editable audio file may be encrypted on the storage device with a predetermined duration.

In another embodiment of the present subject matter, the predetermined duration of the editable audio file may be 30 seconds.

In another embodiment of the present subject matter, the server may transcode the editable audio file into u-law 64 kbps.

In another embodiment of the present subject matter, the server may further smoothen the editable audio file of predetermined duration into a cut portion of 20 seconds.

In another embodiment of the present subject matter, the server may further repeat the transcoded and smoothen editable audio file.

The present subject matter also relates to a system for selecting a ring back tone to be provided to a caller. The system comprising a communication interface for selecting an editable audio file with a predetermined duration, the communication interface communicating a start time of the selected editable audio file to the server; and a server, coupled with a storage device, for encrypting the selected editable audio file on to the storage device.

In another embodiment of the present subject matter, the server transcodes and smoothens the selected portion of the editable audio device to repeat in a loop and the server transfers the transcoded audio file to the mobile operator network as a ring back tone.

BRIEF DESCRIPTION

DETAILED DESCRIPTION

Figure 1:
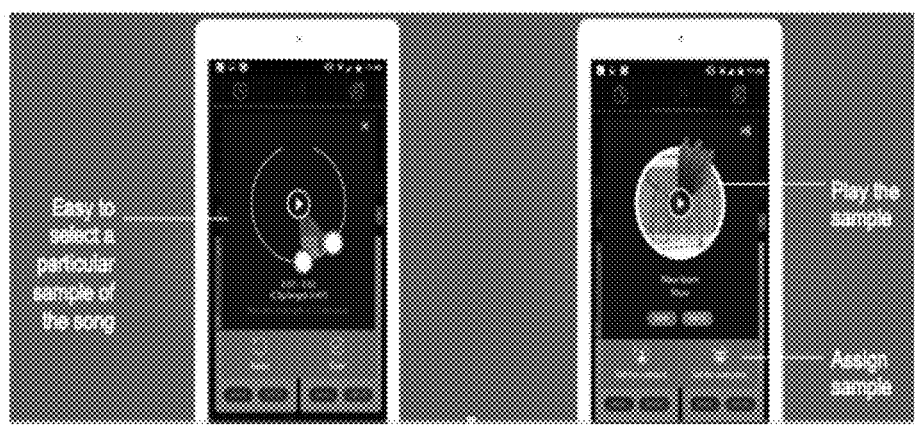
FIG. 1 illustrates the ring back tone in accordance with an embodiment of the present subject matter.

Exemplary embodiments now will be described with reference to the accompanying drawings. The invention may, however, be embodied in many different forms and should not be construed as limited to the embodiments set forth herein; rather, these embodiments are provided so that this invention will be thorough and complete, and will fully convey its scope to those skilled in the art. The terminology used in the detailed description of the particular exemplary embodiments illustrated in the accompanying drawings is not intended to be limiting. In the drawings, like numbers refer to like elements.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

As used herein, the singular forms "a", "an" and "the" are intended to include the plural forms as well, unless expressly stated otherwise. It will be further understood that the terms "includes", "comprises", "including" and/or "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The figures depict a simplified structure only showing some elements and functional entities, all being logical units whose implementation may differ from what is shown. The connections shown are logical connections; the actual physical connections may be different.

In addition, all logical units described and depicted in the figures include the software and/or hardware components required for the unit to function. Further, each unit may comprise within itself one or more components, which are implicitly understood. These components may be operatively coupled to each other and be configured to communicate with each other to perform the function of the said unit.

The present subject matter relates to an installed application either on mobile or desktop, the user may view the full track songs for which the procurement and the music editing rights for the user has been obtained.

The present subject matter further relates to a system for selecting a ring back tone that is to be provided to caller. The system for selecting a ring back tone may be by way of an application installed on a mobile device. A subscriber or a user may initially install the mobile application on their mobile device. Further, the subscriber may select an editable audio file on the communication interface of the mobile device. The subscriber identifies the editable songs by a unique scissors icon at the top right corner of the music artwork.

In an embodiment of the present subject matter, the subscriber can preview the song inside the mobile application for 30 seconds continuously at one stretch i.e., the subscriber may listens to the entire song, but with a break after every 30 seconds. The subscriber then moves the selected part to be able to listen to the following 30 seconds. This makes sure that the end-user does not use the service to listen to the full song like on a music streaming service.

In another embodiment of the present subject matter, the mobile application of the mobile device may be connected with an application server. The application server will either stream or support progressive download feature for delivering the selected section of full track to user device over HTTP at different bitrates. The backend server ensures secured access to full track content and an optimal use of bandwidth. The mobile application ensures that the full content is not stored on a storage device, and that only the 30 seconds selected are encrypted on the storage device. All previews including pre-cut RBTs are streamed using HTTP adaptive streaming.

The mobile application then passes on the start time of portion where RBT has to be cut on full track to server post selection by the subscriber. Instead of uploading the selected cut content to the back-end server, the mobile application only sends the start time of the selection. The subscriber can then play the selected cut RBT content from the encrypted content directly from the device.

In an embodiment of the present subject matter, the encryption occurs in the server basis of the inputs from application, input are user unique identifiers, device identifiers, time stamp of the request, and content identifiers. The encryption algorithm follows a two-step custom process. The audio file has no other significance other than encryption.

The server cuts the RBT from user specified start time on full track, transcode it into u-law 64 kbps, smoothen the edge of cut (to avoid the harshness at edges of cuts). The cut portion is 20 s (duration=Start time+20 s), and then it goes in a loop. The server keeps a link of created cuts to full track metadata along with the cut RBT start time stamp and user info who and when cut. This information is then used for reporting and to show most liked/trending full tracks for RBT The server will then distribute the transcoded and transrated 20 sec cut RBTs to the distributed tone players on the mobile operator network immediately after user puts the sampled cut as his RBT.

Figure 2:
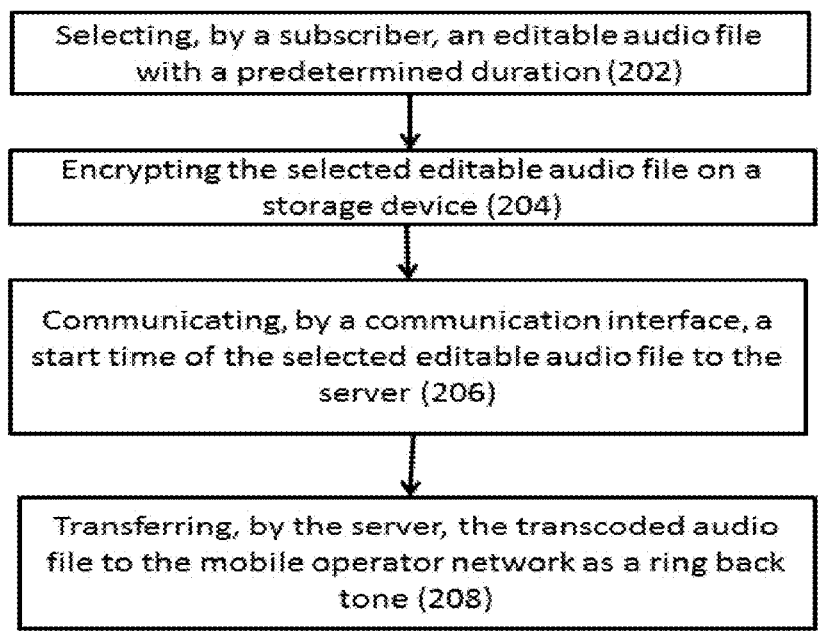
FIG. 2 illustrates a method for selecting a ring back tone in accordance with an embodiment of the present subject matter.

FIG. 2 illustrates a method for selecting a ring back tone in accordance with an embodiment of the present subject matter. The method for selecting a ring back tone comprises a first step 202 of selecting an editable audio file with a predetermined duration by a subscriber in the mobile application. In a second step 204, the mobile applications encrypts the selected editable audio file on a storage device. In a third step 206, the communication interface communicates a start time of the selected editable audio file to the server of the mobile application. The server further transcodes and smoothens the selected portion of the editable audio file. In a subsequent step 208, the server is further configured to transfer the transcoded audio file to the mobile operator network as a ring back tone.

In an embodiment of the present subject matter, the subscriber identifies the editable audio file by a unique scissors icon. The server supports download feature of the selected editable audio file over HTTP at different bitrates. The editable audio file is encrypted on the storage device with a predetermined duration.

In another embodiment of the present subject matter, the predetermined duration of the editable audio file is be 30 seconds.

In another embodiment of the present subject matter, the server may transcode the editable audio file into u-law 64 kbps. The server may further smoothen the editable audio file of predetermined duration into a cut portion of 20 seconds. The server may further repeat the transcoded and smoothen editable audio file.

Figure 3:
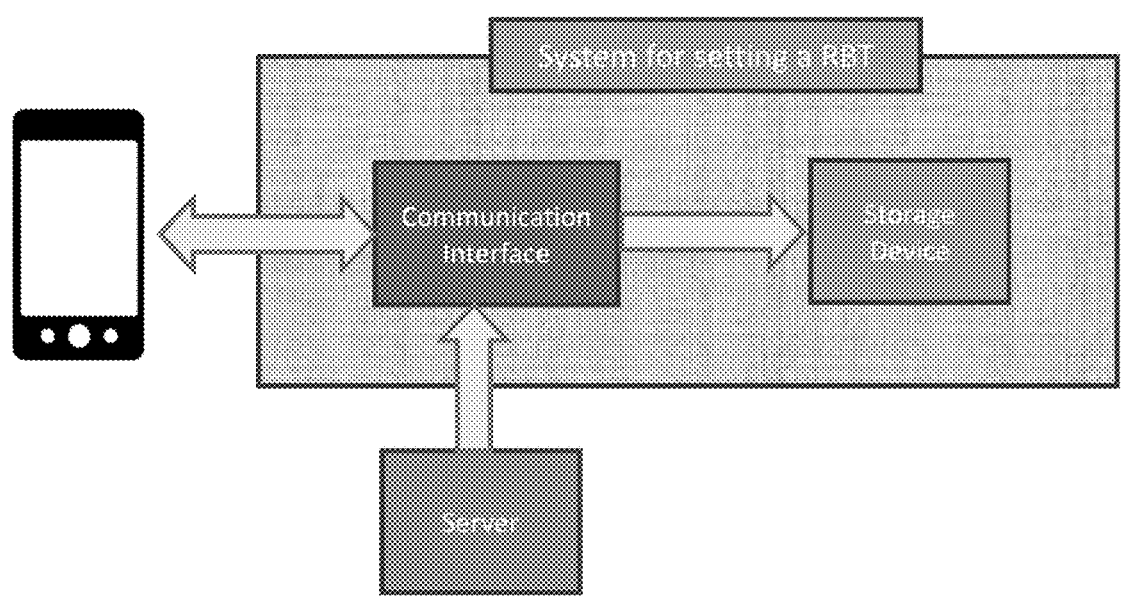
FIG. 3 illustrates a block diagram of a system for setting a ring back tone to be provided to a caller in accordance with an embodiment of the present subject matter.

FIG. 3 illustrates a block diagram of a system for setting a ring back tone to be provided to a caller in accordance with an embodiment of the present subject matter. The system for selecting a ring back tone comprises a mobile device. The mobile device may comprise a mobile application for setting a ring back tone.

In an implementation of the present subject matter, the mobile application of the mobile device comprises a communication interface. The communication interface receives the user or subscriber input. The user initially selects an editable audio file with a predetermined duration. In an example, the predetermined duration for viewing the editable audio device may be 30 seconds. Further, the communication interface of the mobile application may also be coupled to a storage device of the mobile device. The storage device of the mobile device may be used to download data, for example, audio files, from a third party, for example, a server. Further, the application ensures that the full content of the editable audio file is not stored on the storage device and that only the predetermined duration of the selected editable audio file are encrypted on the storage device.

In another implementation of the present subject matter, the mobile device may be connected to an online server. The server may be directed linked to the communication interface of the mobile application and the storage device. The server may further encrypt an editable audio file that has been selected by the user or subscriber using communication interface. Further, the server receives a signal from the communication interface regarding the start time of the selected editable audio file. On receiving the start time from the communication interface, the server further transcodes the selected editable audio file into a u-law 64 kbps and smoothens the edge of the cut audio file. The server smoothens the edge of the cut audio file to avoid harshness at the edges of the cut audio file. The cut audio file has a duration of about 20 seconds, i.e., start time of the audio file as received by the server with an additional 20 seconds of the encrypted audio file. This cut audio file is then run or repeated in a loop.

In another implementation of the present subject matter, the server transfers the transcoded audio file to a mobile operator as a ring back tone that may further be available to the caller of the mobile phone.

As will be appreciated by one of skill in the art, the present invention may be embodied as a method, system, or computer program product. Accordingly, the present invention may take the form of an entirely hardware embodiment, a software embodiment or an embodiment combining software and hardware aspects. Furthermore, the present invention may take the form of a computer program product on a computer-usable storage medium having computer-usable program code embodied in the medium.

Furthermore, the present invention was described in part above with reference to flowchart illustrations and/or block diagrams of methods, apparatus (systems), and computer program products according to embodiments of the invention.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus like a scanner/check scanner to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and schematic diagrams illustrate the architecture, functionality, and operations of some embodiments of methods, systems, and computer program products for managing security associations over a communication network. In this regard, each block may represent a module, segment, or portion of code, which comprises one or more executable instructions for implementing the specified logical function(s). It should also be noted that in other implementations, the function(s) noted in the blocks may occur out of the order noted in the figures. For example, two blocks shown in succession may, in fact, be executed substantially concurrently or the blocks may sometimes be executed in the reverse order, depending on the functionality involved.

In the drawings and specification, there have been disclosed exemplary embodiments of the invention. Although specific terms are employed, they are used in a generic and descriptive sense only and not for purposes of limitation, the scope of the invention being defined by the following claims.

What is claimed is:

1. A method for selecting a ring back tone to be provided to a caller, the method comprising:
  selecting, by a subscriber, an editable audio file with a predetermined duration, wherein the subscriber identifies the editable audio file by a unique edit icon;
  encrypting the selected editable audio file on a storage device;
  communicating, by a communication interface, a start time of the selected editable audio file to a server, the server transcodes and smoothens the selected portion of the editable audio file, wherein the server transcodes the editable audio file into u-law 64 kbps; and the server further smoothens the editable audio file of predetermined duration into a cut portion of 20 seconds, wherein the edited audio file is again transcoded and smoothened to repeat in a loop; and
  transferring, by the server, the transcoded audio file to the mobile operator network as a ring back tone.

2. The method as claimed in claim 1, wherein the server supports download feature of the selected editable audio file over HTTP at different bitrates.

3. The method as claimed in claim 1, wherein the editable audio file is encrypted on the storage device with a predetermined duration.

4. The method as claimed in claim 1, wherein the predetermined duration of the editable audio file is 20 seconds.

5. A system for selecting a ring back tone to be provided to a caller, the system comprising:
- a communication interface for selecting an editable audio file with a predetermined duration, the communication interface communicating a start time of the selected editable audio file to the server, wherein the caller identifies the editable audio file by a unique edit icon; and
- a server, coupled with a storage device, for transcoding and encrypting the selected editable audio file on to the storage device,
- wherein the server transcodes and smoothens the selected portion of the editable audio device to repeat in a loop and
- wherein the server transcodes the editable audio file into u-law 64 kbps; and the server further smoothens the editable audio file of predetermined duration into a cut portion of 20 seconds, wherein the edited audio file is again transcoded and smoothened to repeat in a loop; and
- wherein the server transfers the transcoded audio file to the mobile operator network as a ring back tone.

6. The system as claimed in claim 5, wherein the system is implemented on a desktop or a mobile device.

* * * * *